United States Patent [19]

Hayes-Sheen

[11] Patent Number: 4,934,492
[45] Date of Patent: Jun. 19, 1990

[54] AUTOMATIC VEHICLE BRAKE LOCK SYSTEM

[76] Inventor: Michael P. Hayes-Sheen, 163 Goulasis Avenue, Sault St. Marie, Ontario, Canada, P6A 5N4

[21] Appl. No.: 335,809

[22] Filed: Apr. 10, 1989

[51] Int. Cl.⁵ .................................................. B60T 17/16
[52] U.S. Cl. ........................................ 188/353; 303/89
[58] Field of Search ............... 303/89; 188/353, 265, 188/151 A, 152; 180/271, 272, 279, 287, 289; 192/1.31, 1.34, 1.35, 1.36, 1.37, 1.38, 1.39, 1.21; 60/545, 568, 569, 570; 137/598; 70/255

[56] References Cited

U.S. PATENT DOCUMENTS

| | | | |
|---|---|---|---|
| 2,502,118 | 3/1950 | Ashton et al. | 137/144 |
| 2,579,904 | 12/1951 | Castner | 188/152 |
| 2,585,711 | 2/1952 | Whitney et al. | 137/139 |
| 2,601,909 | 7/1952 | Seppmann | 188/152 |
| 2,695,685 | 11/1954 | Jamison | 188/152 |
| 2,826,390 | 3/1958 | Bailey | 251/139 |
| 3,298,471 | 1/1967 | Evans | 188/152 |
| 3,322,246 | 5/1967 | Noguchi | 192/0.049 |
| 3,468,586 | 9/1969 | Balkus | 303/89 |
| 3,513,946 | 5/1970 | Rick | 188/353 X |
| 3,515,442 | 6/1970 | Whittemore | 303/89 |
| 3,617,663 | 11/1971 | Whittemore | 200/61.86 |
| 3,653,730 | 4/1972 | Cvetkovich | 303/89 |
| 3,688,879 | 9/1972 | Buletti | 303/89 X |
| 3,770,324 | 11/1973 | Stevenson et al. | 303/89 X |
| 3,895,698 | 7/1975 | Fontaine | 188/353 X |
| 4,258,819 | 3/1981 | Baptiste, Sr. | 303/89 X |
| 4,519,653 | 5/1985 | Smith | 303/89 |
| 4,546,846 | 10/1985 | Myers | 188/353 X |
| 4,579,202 | 4/1986 | McIntosh | 192/0.09 |
| 4,717,207 | 1/1988 | Kubota et al. | 188/353 X |
| 4,777,377 | 10/1988 | Jeter | 303/89 X |
| 4,793,661 | 12/1988 | Munro | 188/353 X |

*Primary Examiner*—Douglas C. Butler
*Attorney, Agent, or Firm*—LaValle D. Ptak

[57] ABSTRACT

An automatic brake locking system, for locking the brakes of a vehicle having a hydraulic brake system, is operated every time the ignition switch is turned off to apply pressure through an auxiliary brake actuating device to lock the brakes and hold them locked until the auxiliary brake actuating device is released. A safety switch is provided to operate in conjunction with the ignition switch; so that the safety switch and the ignition switch both must be operated to an "on" position to release the auxiliary brake actuating device to allow normal operation of the vehicle. Turning on the ignition switch without operation of the safety switch does not permit movement of the vehicle since the auxiliary brake actuating device continues to be operated. The system is a passive system, which it does not require any separate actions on the part of the vehicle operator to cause the auxiliary brake actuating device to be operated when the vehicle ignition switch is turned off.

9 Claims, 3 Drawing Sheets

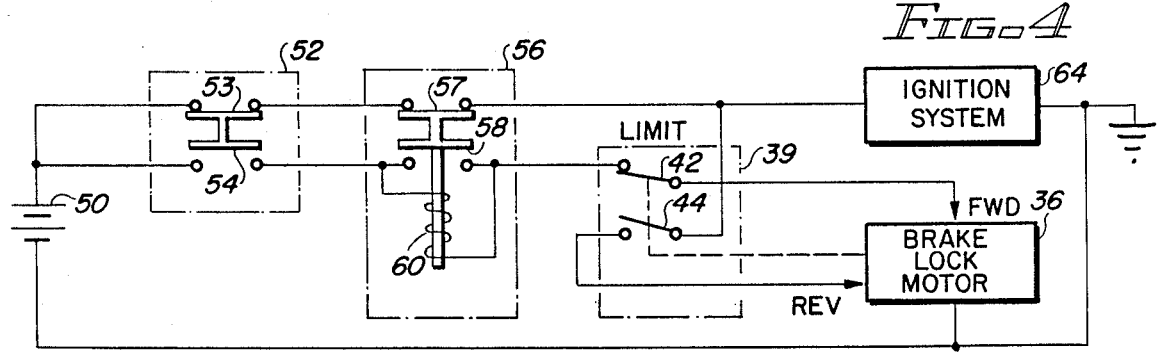
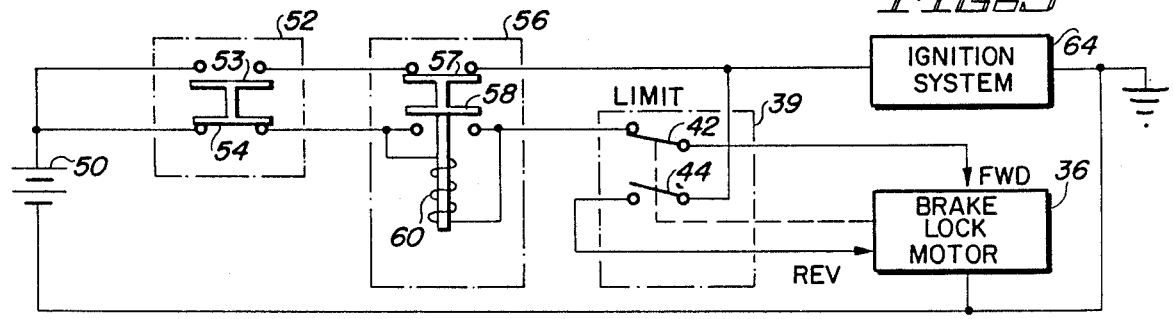
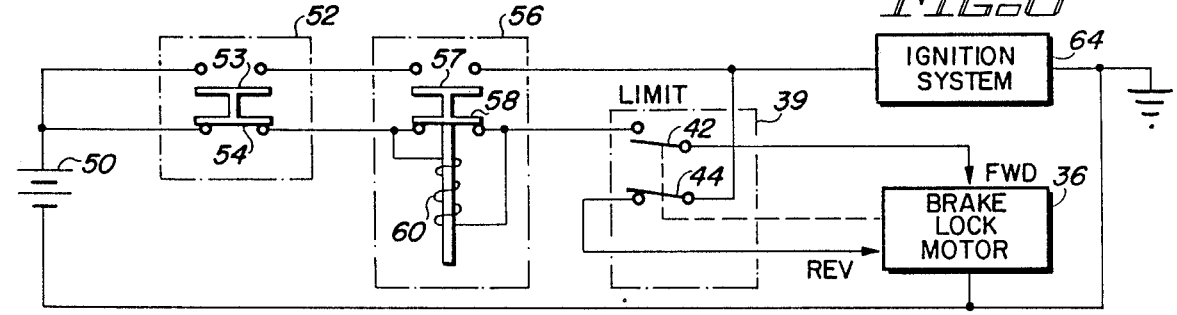
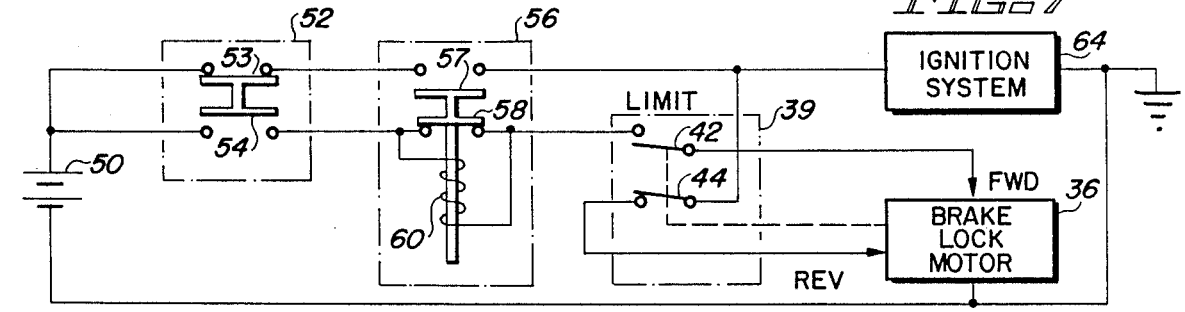
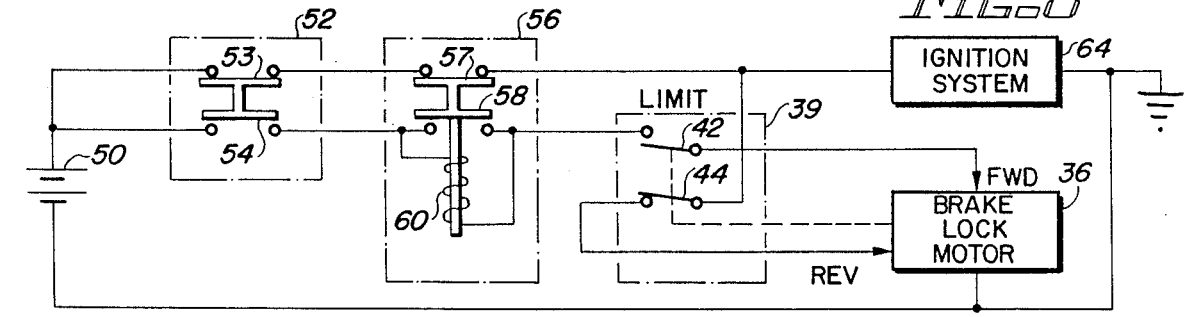

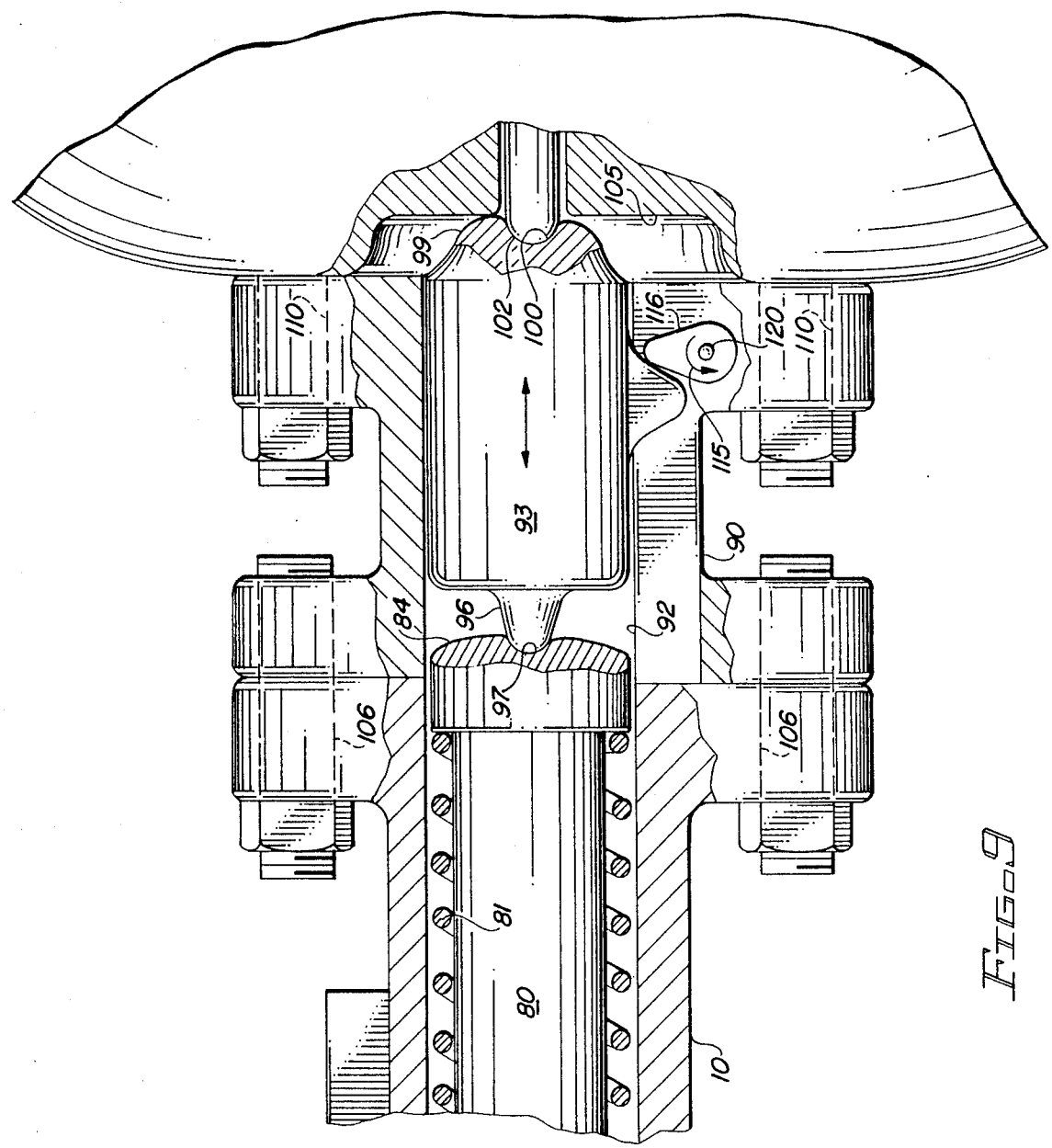

AUTOMATIC VEHICLE BRAKE LOCK SYSTEM

BACKGROUND

Automobile theft in the United States and in other countries constitutes a serious problem. The number of automobiles stolen, whether for simple "joy riding" or criminal intent to permanently deprive the owner of the use of the automobile, is substantial. In addition to the significant losses to automobile owners and automobile insurers, stolen automobiles frequently are driven in a dangerous manner creating significant risk to other drivers in the vicinity of such a stolen automobile.

In an effort to reduce the number of vehicles which are stolen, some theft protection devices have been incorporated into automobiles by manufactures for some time. Most automobiles have a steering lock which is engaged when the ignition switch is turned to its "off" position and the ignition key is removed from the vehicle. Usually this is a mechanical lock; and it is effective to prevent the automobile from being driven away, even if the ignition system is "jumpered" to permit starting of the engine. Steering wheel lock systems, however, can be broken relatively easily; and if they are broken, they are costly to replace or repair.

Most modern automobiles also have a buzzer or gong-type of alarm system which is sounded any time the driver's door of the vehicle is opened when the ignition key is left in the ignition lock after the engine has been turned off. The use of this type of alarm lessens the possibility that the driver will leave the vehicle with the key in the ignition lock. As a result, if the ignition key has been removed, it generally is necessary for a thief to "jumper" or "hot-wire" the vehicle ignition system in order to start the vehicle. For a skilled thief, however, the time required to do this is relatively short (usually less than 45 seconds); so that removal of the key is not a particularly great deterrent for an experienced car thief.

Another approach to minimizing the possibility of the theft of an automobile is to install a siren type of audible alarm system in the vehicle. This alarm is activated any time the door (or hood) of the vehicle is opened without first deactivating the alarm. Generally, alarms of this type are activated and deactivated by a separate key or computer key pad control. If the vehicle door is opened without first deactivating a previously activated alarm, a loud audible alarm is sounded to call attention to the vehicle of residents or passersby in the vicinity of the vehicle. Because of the extremely loud noise which such alarms generate, a potential thief generally will leave the vicinity of the vehicle immediately after the alarm is set off. Alarms of this type, however, are relatively expensive to install and constitute an additional nuisance, inasmuch as they must be separately activated by the vehicle owner or driver each time the vehicle is parked and then must be deactivated by means of a separate action each time the owner wishes to drive the vehicle. Because of these additional steps, vehicle owners frequently forget to activate the alarm or purposely neglect to activate the alarm if the vehicle is to be parked in a location for a relatively short period of time. In view of the fact that a thief usually can get a motor vehicle started and underway within 45 seconds, the practice of leaving a vehicle alarm turned off for even short time intervals completely defeats the purpose for which the alarm originally was installed.

A different approach to theft prevention which exists in the prior art is to engage or lock the main brakes of a vehicle to maintain braking pressure on the vehicle brakes whenever the vehicle is stopped and the ignition is turned off. Such systems typically utilize a check valve in the brake system which functions to maintain the brake pressure when the ignition is off. In most of these systems, brake pressure must be applied to the brakes through the normal actuation of the brake pedal, prior to and during the turning off of the ignition switch, to cause fluid pressure to be applied through the check valve to the brakes. Upon release of the brake pedal, the check valve prevents fluid return to the master cylinder; and the brakes are held engaged. A variety of different techniques then may be employed to release the check valve so that normal operation of the vehicle may be resumed. Such release is automatically effected in some systems by turning on the ignition switch, while other systems employ additional switches or mechanisms which must be operated by the vehicle operator in conjunction with the turning on of the ignition switch before the brakes are released and operation of the vehicle may be resumed.

Typical patents of this general type are the patents to Cvetkovich #3,653,730; Whittemore #3,617,663; and Noguchi #3,322,246.

In all of the prior art brake locking systems known to applicant, it is necessary for the driver to take some type of positive action to insure that the brakes are locked once the ignition is turned off and the key is removed. In many of the prior art systems, this involves the application of pressure through the brake pedal itself. In some systems, some other mechanisms must be operated. In all of these systems, however, it is possible to stop the vehicle turn it off and remove the ignition key without engaging the brake locking system. As a consequence, unless the vehicle operator goes through such a separate step, comparable to the activation of the audible alarms discussed above, the vehicle frequently is left unattended without the brakes being locked. In such an event, a potential thief has no more difficulty in stealing such a brake-lock equipped vehicle than he has for a conventional vehicle without such a system in it.

Brake lock systems, of the types described in the above identified patents, however, appear to be a desirable approach to theft prevention, provided they are utilized each time the vehicle is left unattended. A secondary advantage of such brake lock system is that the additional safety of preventing an unattended vehicle from rolling is automatically attained as part of the theft prevention feature. For example, if a vehicle is parked on a hill, the application of an anti-theft brake locking system also functions to prevent the vehicle from accidentially rolling down the hill, since it is incapable of doing this so long as the brakes remain applied.

It is desirable to provide an improved fully-automatic, vehicle hydraulic brake-locking system which overcomes the disadvantages of the prior art systems and which is relatively inexpensive, easy to install, and is as effective and fool-proof as possible to significantly minimize the potential for theft of a vehicle on which the system is installed.

SUMMARY OF THE INVENTION

Accordingly, it is an object to provide an improved theft prevention device for motor vehicles.

It is another object of this invention to provide a brake lock system for a motor vehicle for locking the brakes when the vehicle is unattended.

It is an additional object of this invention to provide an automatic brake lock system for a vehicle which is engaged each time the ignition switch is turned off.

It is a further object of this invention to provide an improved brake lock system for the hydraulic brake system of a vehicle to engage the vehicle brakes whenever the ignition is turned off.

In a preferred embodiment, the hydraulic brakes of a motor vehicle are automatically engaged every time the ignition switch of the vehicle is turned off. This is effected by means of an electrically operated control device which applies hydraulic pressure through the conventional vehicle brake lines in response to the turning off of the ignition without any additional intervention by the vehicle operator. Release of the pressure is effected by a separate operation of the control device in conjunction with the subsequent turning on of the ignition switch of the vehicle.

BRIEF DESCRIPTION OF THE DRAWINGS

FIGS. 4, 5, 6, 7 and 8 illustrate further details of the electrical control system of the embodiment shown in FIGS. 2 and 3; and FIG. 9 is a cross-sectional view of another embodiment of the invention.

DETAILED DESCRIPTION

Figure 1:
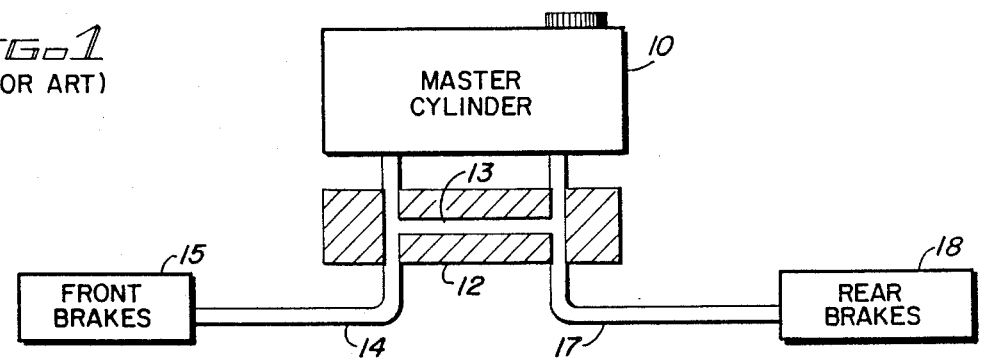
FIG. 1 is a diagrammatic view of a typical hydraulic brake system for a motor vehicle.

Reference now should be made to the drawings in which the same reference numbers are used throughout the different figures to designate the same or similar components. FIG. 1 is a diagrammatic illustration of a conventional hydraulic brake system for a motor vehicle, such as an automobile or truck. Such systems are in widespread use and utilize a master cylinder 10 which is filled with hydraulic brake fluid. The master cylinder, in turn, includes a brake proportioning system 12 which interconnects, by way of a passageway 13, front and rear brake fluid lines 14 and 17. These lines operate the front brakes 15 and rear brakes 18 respectively, of the vehicle.

The master cylinder 10 includes a piston which is operated by application of the brake pedal to apply pressure to the fluid in the lines 14 and 17 to operate "slave" or wheel cylinders for the front and rear brakes of the vehicle. For automobiles or trucks which include a power brake system, the piston in the master cylinder 10 is actuated through a power assist or vacuum unit instead of through a direct mechanical linkage. The application of pressure through the brake fluid lines 14 and 17 to the front and rear brakes 15 and 18, however, is the same, whether or not the braking system is power assisted.

Figure 2:
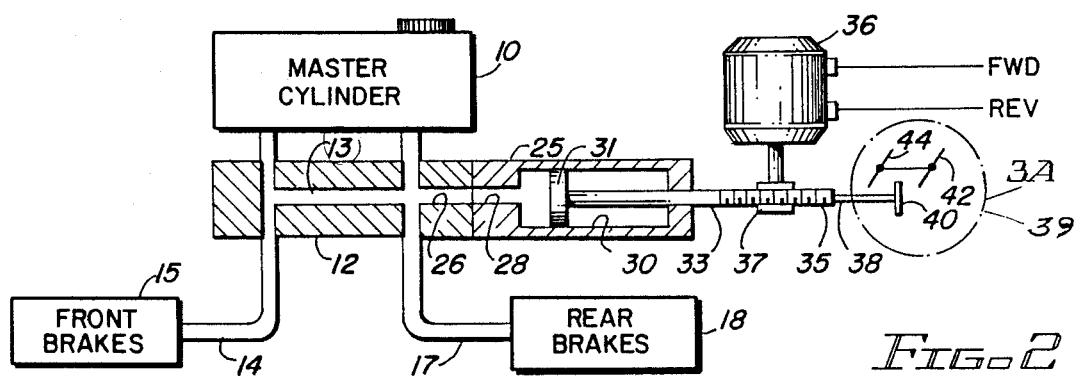
FIG. 2 is a diagrammtic view of a preferred embodiment of the invention.

In accordance with a preferred embodiment of the invention, the typical prior art brake system shown in FIG. 1 is modified to include additional components for applying pressure to the front and rear brakes 15 and 18 by way of the brake fluid lines 14 and 17 automatically and continuously during the time the vehicle is parked with the ignition turned off. To accomplish this, in the embodiment of FIG. 2, the brake proportioning system is modified to provide an hydraulic fluid channel 26 through the right-hand end (as viewed in FIG. 2). An automatic brake lock unit 25 then is secured in any suitable manner to provide a fluid tight connection between the right-hand end of the proportioning system 12 and the left-hand end of the cylinder 25. A fluid channel 28 is aligned with and opens into the channel 26 and expands into a larger cylinder 30. A piston 31 is mounted for reciprocal movement within the cylinder 30 and has a shaft 33 extending to the right, as shown in FIG. 2. The shaft 33 has a portion 35 for engagement with a driving gear 37 of a reversible electric motor 36. The right-hand end of the portion 35 also carries an extension 38 with a switch operating projection 40 on it.

In operation, the device of FIG. 2 is controlled by the operation of the motor 36, which is driven in either its forward direction (to drive the piston 31 to the left) or its reverse direction (to drive the piston 31 to the right). The projection 40 is used to engage one or the other of a pair of limit switch contacts 42 and 44 of a limit switch 39 in accordance with the direction in which the motor 36 is driven. Interconnections between the contacts 42 and 44 are used to turn off the motor 36 once the appropriate limit has been reached.

Figures 3A, 3B:
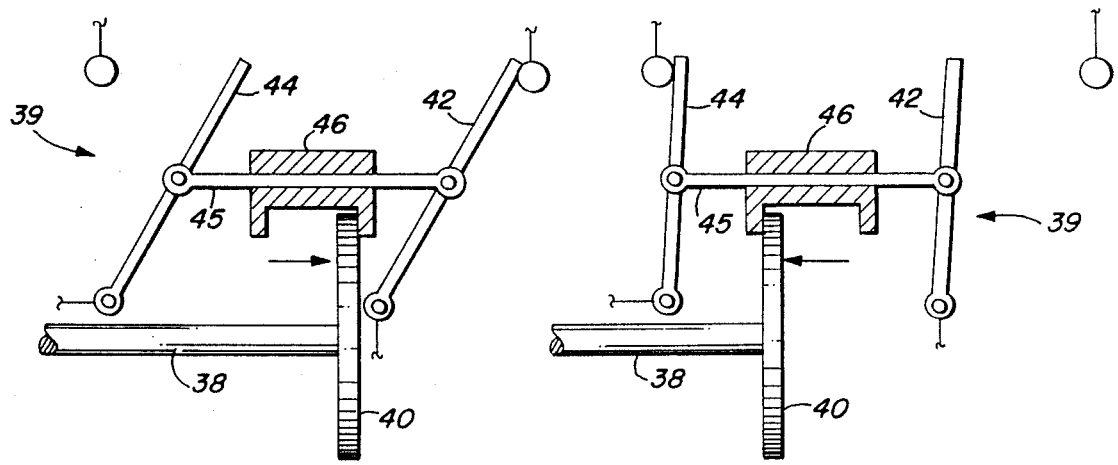
FIGS. 3A and 3B illustrate details of a portion of the embodiment shown in FIG. 2.

The manner in which the projection 40 functions to move the contacts 42 and 44 from one position to another is shown most clearly in FIGS. 3A and 3B. The contacts 42 and 44 are interconnected by a non-conductive bar 45, which is pivotally connected to the contacts 42 and 44 intermediate their length. The bar 45 carries a member 46 at its mid-section, and the contacts 42 and 44 are pivoted about fixed pivots at their lower ends, as illustrated in FIGS. 3A and 3B. When the limit switch member 40 has moved to the extreme right position as shown in FIG. 3A, it engages a projection on the lower right-hand side of the member 46 to push the contacts 42 and 44 to the position shown in FIG. 3A. In this position, the contact 42 closes a circuit connected between its lower end and a fixed contact at its upper end while the contact 44 opens a similar circuit. When the member 40 is driven to the left as shown in FIG. 3 (the forward direction of the motor 36), operation continues until the position shown in FIG. 3 is reached at which time the contact 44 closes a circuit through it, while the contact 42 opens the circuit described previously in conjunction with FIG. 3A. As described subsequently, whenever the contacts 42 and 44 first reach the position shown for the limits of FIGS. 3A and 3B as a result of operation of the motor, the circuit to the motor is turned off until operation in the opposite direction subsequently is called for.

Under normal operation of the brake system, the motor 36 has pulled the piston 31 to the maximum position toward in the right, as illustrated by the switch positions of FIG. 3A. So long as the vehicle continues to be operated, the brake system operates in precisely the same manner as the standard hydraulic brake system illustrated in FIG. 1. Operation of the brake pedal is effected in its normal manner, and the braking system is wholly uneffected by the provisions of the additional components shown in FIG. 2.

When the vehicle is to be parked, however, the motor 36 is operated from the position shown in 3A, in its forward direction, to drive the piston 31 to the left, as illustrated in FIG. 2. This applies pressure on the hydraulic fluid within the cylinder 30 and through the channels 26 and 28 to the brake fluid lines 14 and 17 to operate or lock both the front and rear brakes 15 and 18 of the vehicle. The motor operates in this direction until the limit of FIG. 3B is reached at which time the motor shuts off. The piston 31, however, continues to apply the pressure to the brakes 15 and 18 until subsequent is withdrawn or pulled to the right to relieve this auxiliary pressure.

Reference now should be made to FIGS. 4 through 8 which illustrate the electrical circuit interconnections used to operate the system shown in FIGS. 2 and 3. FIG. 4 illustrates the operation of the system of a preferred embodiment of the invention when the vehicle is being driven on the road in its normal manner. A battery 50 supplies operating current to the ignition system 64 of the vehicle through an ignition switch 52 and an added safety switch 56. The ignition switch 52 of the vehicle has been modified to cause it to be a double-pole, double-throw switch with an upper contact 53, comparable to the normal ignition switch contact for the vehicle. In the upper position, the switch 53 applies current from the battery 50 through the upper closed contacts 57 of a second double-pole, double-throw safety switch 56.

The circuit across these upper contacts 53 and 57 to the ignition system 64 then permits the vehicle to be operated its normal manner. In this mode of operation, the limit switch 39 has the contact 42 closed to complete a conductive path through the contact 42 to the "forward" input of the brake lock motor 36. described previously. The lower contact 44 is open, so that an open circuit is connected to the "reverse" input of the motor 36. During normal operation of the vehicle, however, no current is applied to either the forward or the reverse inputs of the motor 36 since the lower set of contacts 58 of the safety switch 56 and the lower set of contacts 54 of the ignition switch 52 both cause an open circuit to be present between the battery 50 and the upper contact set 42 of the limit switch 39.

Assume now that the vehicle is stopped and parked in the normal manner. Whenever a driver desires to stop operating such a vehicle, the ignition switch 52 is turned off. This is illustrated in FIG. 5 by movement of the contact set of the ignition switch 52 to the lower position. This opens the ignition system circuit between the battery 50 and the ignition system 64 to disable the ignition system 64 in a conventional manner. The lower set of contacts 54 of the ignition switch 52, however, now complete a circuit from the battery 50 through the now closed lower contacts 54 and the operating coil of a solenoid 60 for operating the safety switch 56.

Current passing through the operating coil of the solenoid 60 also is applied through the now closed switch contact 42 to the "forward" input of the motor 36. Consequently, the motor 36 is automatically operated to drive the piston 31 of FIG. 2 to the left, as illustrated in FIG. 2, to apply pressure through the fluid brake lines 14 and 17 to lock or operate the front and rear brakes 15 and 18 of the vehicle. This current which is used to operate the motor 36 also causes the solenoid 60 to pull the safety switch contact pair 57 and 58 to the lowermost position, to open the circuit previously closed by the contacts 57 and to close a circuit from the lower set of contacts 54 of the ignition switch 52 through the contact 58 to the upper contact set 42 of the limit switch 39. This happens relatively soon after operation of the ignition switch 52 to the position shown in FIG. 2, but has no affect on the operation of the motor 36, until the motor 36, pulls the limit switch engagement member 40 to the position shown in FIG. 3B.

When the limit switch 39 is operated to the position shown in FIG. 3B, the maximum desired pressure for locking the front and rear brakes 15 and 18 by means of the piston 31 has been effected. At this time, it is desirable to turn off the motor 36. The manner in which this is done is illustrated in FIG. 6. The contact 42 opens the circuit previously available from the battery 50 through the contacts 54 and 58 (or alternatively the solenoid 60), so that the supply of "forward" current to the motor 36 is interrupted, turning off the motor. The contact 44 now completes an operating circuit to the "reverse" input of the motor 36 from the supply line to the input of the ignition system 64; but both sets of upper contacts 53 and 57 of the switches 52 and 56 are open at this time. Consequently, there is no operating current applied to either of the two inputs to the motor 36; and it remains turned off. This condition exists so long as the vehicle remains parked with the ignition switch turned off.

The vehicle cannot be moved since both the front and rear brakes 15 and 18 are firmly locked in an engaged condition of operation through the continuos application of pressure through the fluid lines 14 and 17 by the piston 31. Consequently, the vehicle cannot be towed away, nor will it accidentally move from the position in which it is placed. This is an important safety feature since there is no necessity to engage a parking brake to effect this condition of operation.

It should be noted that the automatic locking of the brakes of the vehicle takes place without any conscious effort on the part of the operator. The vehicle operator simply turns off the ignition 52 in a normal manner and leaves the vehicle. The operation which has been described above in conjunction with FIGS. 4 through 6 is effected automatically every time the ignition switch 52 is turned off or moved from the position shown in FIG. 4 to the one shown in FIG. 5.

Now assume that the vehicle operator desires to move the vehicle. The first step is to turn on the ignition switch 52, as illustrated in FIG. 7. This opens the contacts 54 and closes the upper set of contacts 53. The ignition system 64, however, is not supplied with operating current by this act. It is additionally necessary to operate the safety switch 56 from the position shown in FIG. 7 back to the position shown in FIGS. 4 and 8 before the vehicle can be moved. If the ignition switch 52 alone is operated or if a thief were to jump the ignition system, the vehicle still would be left in the operating condition shown in FIG. 7. In this condition of operation, the brakes remain locked, since the motor 36 has not been operated in its reverse direction to relieve the pressure which locks the brakes.

The safety switch 56 may be in the form of an additional, manually-operated, push-button or toggle switch under the dash, or it may be a more a sophisticated keypad computer operated switch. The mechanism for moving the switch 56 from the lower operating position of FIG. 7 to the upper position of FIG. 4 is not important. The more sophisticated the technique for operating the switch 56, however, the more burglar proof or theft proof the vehicle becomes. In its simplest form, the switch 56 simply is a hidden push-button switch located, for example, beneath the dash. In its most sophisticated form, the switch 57 may be an encoded keypad where it cannot be operated unless the proper code is first entered into the keypad.

Unless the safety switch 56 is operated from the position shown in FIG. 7 to its upper position shown in FIGS. 4 and 8, the vehicle cannot be moved, even though the ignition switch 52 has been turned on or even if the ignition system 64 is energized to start the engine. Starting the engine without operation of the safety switch 56 to reverse the operation of the motor 36 does not in and of itself release the brakes. Thus a thief would be frustrated and unable to move the vehicle, even though it would be possible to have the engine running and put the vehicle in its drive position or shift it to a drive position (for a manual transmission). In such an event, most thieves quickly will give up and go to another vehicle since, if the vehicle cannot be moved within a minute or so at the most, a professional thief will leave it alone and move on.

To effect release of the automatically locked brakes, it is necessary to move the safety switch 56 to the position shown in FIG. 8 either prior to or after operation of the ignition switch 52 to its upper position, as illustrated in FIGS. 7 and 8. When this occurs, two things happen. First, the ignition system 64 is energized as described reviously in conjunction with FIG. 4. At the same time, however, operating current is applied from the battery 50 through the upper contacts 53 and 57 of the switches 52 and 56, through the now closed contact 44 (FIG. 8) of the limit switch 39 to apply operating current to the reverse input of the motor 36. This causes the piston 31 of FIG. 2 to be withdrawn or moved to the right as illustrated in FIGS. 2 and 3. This operation then relieves the pressure in the brake fluid lines 14 and 17 which lock the front and rear brakes 15 and 18.

Once the piston 31 is moved to its maximum position in the reverse or rightward direction, the limit switch 39 is operated, as illustrated in FIG. 3A, to open the contacts 44 and close the contacts 42. When the contacts 44 are opened, the motor 36 stops operating. At this time the system once again is in the condition of operation in FIG. 4. Even though the contacts 42 are closed, no circuit path is provided to the forward input of the motor 36 through these contacts, since both the contacts 54 and 58 are opened, as illustrated in FIG. 4. Thus, the vehicle once again may be operated in its normal manner until the ignition switch 52 is again turned off, as described previously in conjunction with FIG. 5.

The system which has been described above in conjunction with the embodiment of FIG. 2 is particularly suitable for use as original equipment built into an automobile or turck at the time of its manufacture. The principles of the invention, however, also are readily adapted as a retrofit or add-on feature to existing motor vehicles. The manner in which this is accomplished is illustrated in the partial cross-sectional view of a further embodiment in FIG. 9. In the embodiment of FIG. 9, a standard master brake cylinder 10 is illustrated showing an internal piston 80 and return spring 81 of the type typically employed in a brake master cylinder. The right-hand end of such a piston 80 has an extension 84 with a centrally located indentation 97 in it. This indentation normally is engaged by a mating projection 102 of a vacuum power booster 105 for a power brake system of the type used in most vehicles. A projection 102 on the vacuum booster moves to the left to depress the master cylinder to engage the brakes. Upon release, the return spring 81 causes the piston 80 and the projection 102 of the power booster system 105 to move toward the right. Normally the units are bolted together, so that there is a firm mechanical connection between the operating projection 102 of the vacuum booster unit and the indentation 97.

The standard system described in the preceding paragraph is modified in accordance with the embodiment shown in FIG. 9 by adding a spacer unit 90 between the end of the master cylinder from which the projection 84 extends and the vacuum power booster 105 of the vehicle. The section 90 has a cylindrical opening through its center and carries a cylindrically shaped spacer 93 with a projection 96 at its left-hand end for engagement in the indentation 97 of the piston 80 of the master cylinder. On the other end, the spacer 93 has a projection 99 with an indentation 100 in it for engagement by the end of the vacuum power booster piston 102 which normally directly engages the indentation 97 of the master cylinder piston.

The dimensions of the spacer 93 are such that when the master cylinder 10, insert 90, and power vacuum booster 105 are interconnected together, a solid mechanical engagement is made between the projections 96 and 102 with the respective indentations 97 and 100; so that operation of the vacuum power booster 105 in its normal manner effects normal operation of the brakes through the master cylinder 10 as if the unit 90 was not present. The unit 90 is attached by means of bolts 110 to the power vacuum booster in the same position that the master cylinder 10 normally is connected. The other end of the unit 90 has flanges on it for carrying bolts 106 which then connect the other end (left-hand end as viewed in FIG. 9) to the master cylinder 10 in the same positon normally used to connect the master cylinder 10 to the vacuum power booster 105.

A reversible motor 36, operated in the same manner described above in conjunction with the embodiment of FIGS. 2 through 8 then is employed to rotate a cam 116 about a shaft 120. The cam engages a cam follower 115 located on one side of the spacer 93. A slot is provided in the bottom of the cylindrical channel 92 to permit movement of the cam follower 115 within the unit 90. When the cam 116 is in the position shown in FIG. 9, the vehicle may be operated in its normal manner. If, however, the vehicle is parked, and the ignition switch 52 of FIGS. 4 through 8 is turned off (moved to its lowermost position), the motor 36 is operated in the same manner as described previously to rotate the cam 116 counterclockwise, as viewed in FIG. 9, to cause the upper lobe of the cam to engage the projection 115 to move the spacer 93 to the left. This causes operation of the master cylinder piston 80 to be effected in the same manner as if the brakes of the vehicle were applied through the operation of the power booster 105. Once the limit of movement has been reached as controlled by the limit switch of FIGS. 3A and 3B, the motor 36 is turned off. The brakes then remain engaged in the same manner described previously, except that the brake engagement is effected directly through the operation of the master brake cylinder 10 instead of by means of the auxiliary cylinder 25 of the embodiment of FIG. 2.

When authorized movement of the vehicle is to be resumed, the operation of the various switches which have been described previously in conjunction with FIGS. 4 through 8 is effected to cause rotation of the cam 116 in the clockwise (reverse) direction until it attains the position illustrated in FIG. 9. In this position, the motor 36 terminates operation; and the brakes subsequently may be operated in the conventional manner by means of the vacuum power booster 105 and the master cylinder piston 102. The control system for the embodiment shown in FIG. 9 is the same as described previously for the system of FIG. 2 and it is illustrated in detail in FIGS. 4 through 8. The manner of effecting operation of the embodiments of FIGS. 2 and 9 is the same.

The foregoing description of the preferred embodiments of the invention, taken in conjunction with the drawings, is to be considered illustrative of the invention and not as limiting. Various changes and modifications will occur to those skilled in the art without departing from the true scope of the invention. For example, particularly with the embodiment of FIG. 9, a motor 36 which operates to rotate the cam 116 in only one direction may be employed with appropriate limit switches and changes in the cam shapes to effect the desired operation.

I claim:

1. In a vehicle having a source of electric power, an ignition system operated by an ignition switch which is turned on and off to connect and disconnect the ignition system from the source of electric power, and having a hydraulic brake system with a brake fluid reservoir and brake fluid lines between the brake fluid reservoir and brake wheel cylinders; a brake locking anti-theft system including in combination:
   an auxiliary brake actuating device for applying pressure to the brake fluid in said fluid lines independently of normal operation of said brake system, said auxiliary device comprising a cylinder in fluid communication with brake fluid in said lines and a piston located within said cylinder for reciprocal movement therein;
   electrically operated control means comprising a reversible electric motor coupled with the piston of said auxiliary brake actuating device for effecting reciprocal movement of said piston;
   first means coupled with said ignition switch for applying electric power to said control means when said ignition switch is turned off to cause said control means to operated in a first mode to actuate said auxiliary brake device to apply pressure to brake fluid in said lines;
   second means for terminating the application of electric power to said control means to terminate the operation thereof in said first mode, after pressure is applied to said fluid lines by said auxiliary brake actuating device, said auxiliary brake actuating device thereafter holding pressure in said lines; and
   further means coupled with said ignition switch and said control means for operating said control means in a second mode to cause said auxiliary brake actuating device to release pressure on brake fluid in said brake fluid lines after said ignition switch is turned on following the turning off thereof.

2. The combination according to claim 1 wherein said second means comprises a limit switch operated in response to movement of said piston.

3. The combination according to claim 2 wherein said further means comprises a third switch connected between said ignition switch and said ignition system and operated between first and second positions, in said first position thereof said third switch completes an operating circuit between said ignition and said ignition system; and further including means for automatically operating said third switch to the second position thereof in response to turning off of said ignition switch.

4. In a vehicle having a source of electric power, an ignition system operated by an ignition switch which is turned on and off to connect and disconnect the ignition system from the source of electric power, and having a hydraulic brake system with a brake fluid reservoir and brake fluid lines between the brake fluid reservoir and brake wheel cylinders; a brake locking anti-theft system including in combination:
   an auxiliary brake actuating device for applying pressure to the brake fluid in said fluid lines independently of normal operation of said brake system;
   electrically operated control means coupled with said auxiliary brake actuating device for controlling the actuation thereof;
   first means coupled with said ignition switch for applying electric power to said control means when said ignition switch is turned off to cause said control means to operated in a first mode to actuate said auxiliary brake device to apply pressure to brake fluid in said lines;
   second means for terminating the application of electric power to said control means to terminate the operation thereof in said first mode, after pressure is applied to said fluid lines by said auxiliary brake actuating device, said auxiliary brake actuating device thereafter holding pressure in said lines; and
   further means coupled with said ignition switch and said control means for operating said control means in a second mode to cause said auxiliary brake actuating device to release pressure on brake fluid in said brake fluid lines after said ignition switch is turned on following the turning off thereof, said further means comprising third switch means having contacts connected in series circuit between said ignition switch and said ignition system and in series with said second means for preventing the application of electrical power to said ignition system and for preventing operation of said control means to effect release of pressure by said auxiliary brake actuating device until said third switch means is operated from a first position to a second position independently of operation of said ignition switch.

5. The combination according to claim 4 wherein said control means comprises a reversible electric motor; and and said auxiliary brake actuating device comprises a member located for reciprocal movement to apply said pressure to brake fluid in said lines, said motor coupled with said member for effecting such reciprocal movement.

6. The combination according to claim 5 wherein said second means comprises a limit switch operated in response to movement of said member.

7. In a vehicle having a source of electric power, an ignition system operated by an ignition switch which is turned on and off to connect and disconnect the ignition system from the source of electric power, and having a hydraulic brake system with a brake fluid reservoir and brake fluid lines between the brake fluid reservoir and brake wheel cylinders; a brake locking anti-theft system including in combination:
   an auxiliary brake actuating device comprising a cylinder with a reciprocating piston therein for applying pressure to the brake fluid in said fluid lines independently of normal operation of said brake system;
   electrically operated control means comprising a reversible electric motor coupled with the piston of said auxiliary brake actuating device for moving said piston in said cylinder in a first direction to apply pressure to fluid in the brake fluid lines when said motor is operated in a forward direction and to release pressure in said fluid lines when said motor is operated in the reverse direction;

first means coupled with said ignition switch for applying electric power to said control means when said ignition switch is turned off to cause said control means to operated in a first mode to actuate said auxiliary brake device to apply pressure to brake fluid in said lines;

second means for terminating the application of electric power to said control means to terminate the operation thereof in said first mode, after pressure is applied to said fluid lines by said auxiliary brake actuating device, said auxiliary brake actuating device thereafter holding pressure in said lines; and further means coupled with said ignition switch and said control means for operating said control means in a second mode to cause said auxiliary brake actuating device to release pressure on brake fluid in said brake fluid lines after said ignition switch is turned on following the turning off thereof.

8. The combination according to claim 7 wherein said second means comprises a limit switch operated in response to movement of said piston.

9. The combination according to claim 8 wherein said further means comprises a third switch connected between said ignition switch and said ignition system and operated between first and second positions, in said first position thereof said third switch completes an operating circuit between said ignition and said ignition system; and further including means for automatically operating said third switch to the second position thereof in response to turning off of said ignition switch.

* * * * *